United States Patent [19]

Wheatley

[11] Patent Number: 5,763,821
[45] Date of Patent: Jun. 9, 1998

[54] AUTOIGNITION PROPELLANT CONTAINING SUPERFINE IRON OXIDE

[75] Inventor: Brian K. Wheatley, Marshall, Va.

[73] Assignee: Atlantic Research Corporation, Vienna, Va.

[21] Appl. No.: 740,531

[22] Filed: Oct. 30, 1996

Related U.S. Application Data

[63] Continuation-in-part of Ser. No. 649,563, May 17, 1996.

[51] Int. Cl.$^6$ .................................................. C06B 45/10
[52] U.S. Cl. .................. 149/19.5; 149/83; 149/86; 250/741
[58] Field of Search ............... 149/19.5, 83, 86; 280/741

[56] References Cited

U.S. PATENT DOCUMENTS

| | | |
|---|---|---|
| 3,862,866 | 1/1975 | Timmerman et al. ............. 149/21 |
| 4,032,374 | 6/1977 | Douda et al. ..................... 149/83 |
| 4,854,981 | 8/1989 | Goodson et al. .................. 149/2 |
| 4,881,994 | 11/1989 | Rudy et al. ...................... 149/83 |
| 5,056,436 | 10/1991 | Greene ............................ 102/490 |
| 5,439,537 | 8/1995 | Hinshaw et al. ................. 149/37 |
| 5,460,671 | 10/1995 | Khandhadia ..................... 149/83 |
| 5,542,688 | 8/1996 | Scheffee .......................... 280/741 |

*Primary Examiner*—Edward A. Miller
*Attorney, Agent, or Firm*—Lowe, Price, LeBlanc & Becker

[57] ABSTRACT

An autoignition propellant (AIP) is disclosed for use in conjunction with gas generative compositions for air bags to reduce the autoignition temperature of said propellant without adversely affecting the AIP's storage thermal stability. Said AIP consists essentially of A) a mixture of a) about 60 to 80% by weight $KClO_3$, b) about 15 to about 30% by weight lactose and c) about 1 to about 10% by weight of an aliphatic polycarbonate and B) an autoignition lowering effective amount of superfine iron in an amount up to 10% by weight based upon the combined weight of A) and B). A method of using the AIP to lower autoignition temperatures and an air bag inflator containing the AIP are also disclosed.

11 Claims, 1 Drawing Sheet

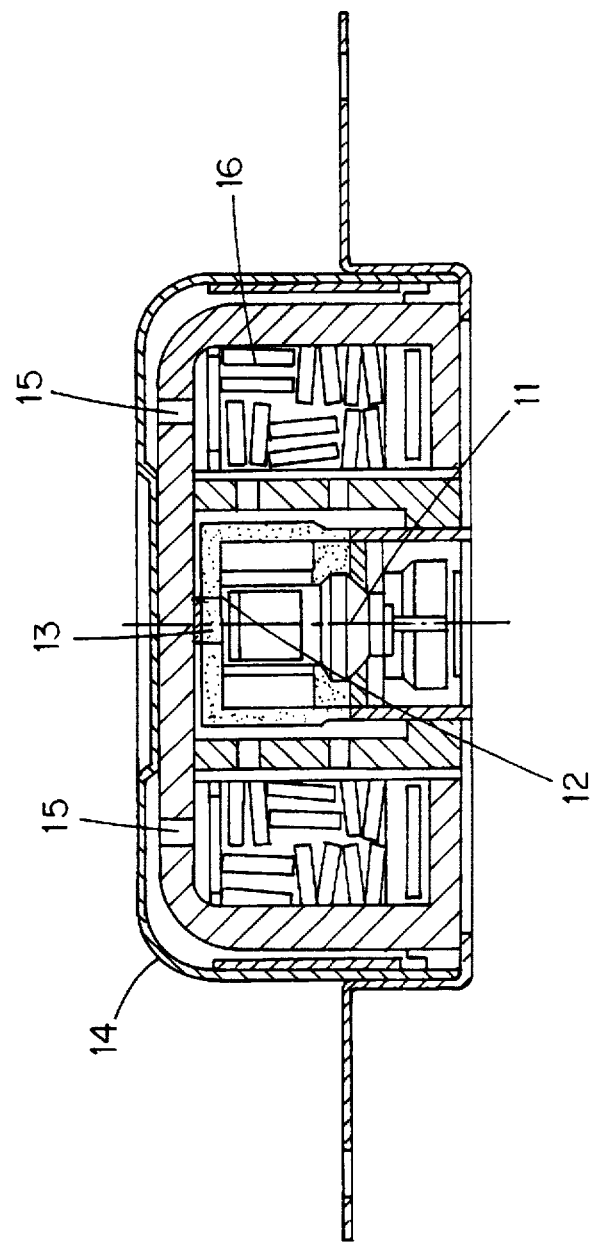

AUTOIGNITION PROPELLANT CONTAINING SUPERFINE IRON OXIDE

This application is a continuation-in-part of application Ser. No. 08/649,563 filed May 17, 1996.

TECHNICAL FIELD

The present invention relates to inflators for devices such as protective passive restraints or air bags used in motor vehicles, escape slide chutes, life rafts, and the like. More particularly, the present invention relates to an igniter for gas-generative compositions used in inflators and a method of lowering the ignition temperature of an igniter below its auto-ignition temperature.

BACKGROUND ART

Many devices, such as protective passive restraints or air bags used in motor vehicles, escape slide chutes, life rafts, and the like, are normally stored in a deflated state and are inflated with gas at the time of need. Such devices are generally stored and used in close proximity to humans and, therefore, must be designed with a high safety factor which is effective at all time.

Inflation is generally accomplished by means of a gas, such as air, nitrogen, carbon dioxide, helium, and the like which is stored under pressure and further pressurized and supplemented at the time of use by the addition of high temperature combustion gas products produced by the burning of a gas-generative composition. In some cases, the inflation gases are solely produced by gas-generative compositions.

It is obviously critical that the gas-generative composition be capable of safe and reliable storage without decomposition or ignition at temperatures which are likely to be encountered in a motor vehicle or other storage environment. For example, temperatures as high as about 107° C. (225° F.) may reasonably be experienced. It is also important that substantially all the combustion products generated during use be non-toxic, non-corrosive, and non-flammable, particularly where the device is used in a closed environment, such as a passenger compartment of a motor vehicle.

Igniters are known for igniting gas-generative compositions in inflators for protective passive restraints used in motor vehicles. Such igniters are themselves ignited by initiators, e.g., electric squibs, which are activated upon a sensed impact of the motor vehicle.

U.S. Pat. No. 4,561,675 to Adams et al. and U.S. Pat. No. 4,858,951 to Lenzen disclose ignition devices for protective passive restraints in which each of the igniter and inflator is contained in an aluminum housing. As discussed in each of these patents, the use of aluminum has become prevalent to reduce weight. As further discussed in each of said patents, the use of aluminum housings presents a disadvantage in that when said housing is exposed to high temperatures, such as those which might be encountered in a fire, the mechanical strength of the aluminum rapidly declines. In such instances, when the autoignition temperature of the igniter is reached, the aluminum housings can rupture or burst, sending pieces and fragments flying in all directions.

To prevent serious damage which may result when igniters and/or gas-generative compositions auto-ignite in heated aluminum housings, said U.S. Pat. Nos. 4,561,675 and 4,858,951 provide igniters which have low autoignition temperatures. Adams et al. rely upon "intimate" thermal contact of the ignition material with the wall of the housing shell. Lenzen utilizes a homogeneous mixture of a booster material and an autoignition material which is a smokeless powder that ignites at a temperature in the range of 300° F. (148.9° C.) to 400° F. (204.4° C).

Although the prior art has recognized and addressed the problem of autoignition temperatures of igniters and/or gas-generative compositions, presently known compositions which lower the ignition temperatures of the entire unit disadvantageously suffer extensive weight loss over required storage temperatures, indicating thermal instability which can adversely affect the required performance of these materials.

The gas-generative compositions of the type presently of interest are disclosed by U.S. Pat. Nos. 3,785,149, as well as divisions thereof, i.e., 3,880,595 and 3,902,934. These patents disclose compositions containing potassium chlorate and materials such as tartaric acid, wherein the tartaric acid is present in amounts of about 20–42% with a complementary amount of the potassium chlorate. On the other hand, in U.S. Pat. No. 3,862,866, wherein the inventor of the first three patents is a co-inventor, the specification discloses the use of organic materials, e.g., lactose, with potassium chlorate. The particle size of the oxidizing powder therein is limited to below 25 microns and that of the "coolant powder" to below about 15 microns. None of the foregoing discloses or would have rendered obvious the invention of the present application.

DISCLOSURE OF THE INVENTION

Accordingly, it is one object of the present invention to provide an improved autoignition propellant (AIP) for inflation devices which is particularly storage stable over extended periods of time and temperature extremes. The improved composition is stable at 225° F. (about 107° C).

Another object of the present invention is to provide a more effective igniter through a reduction in the autoignition temperature of said igniter from approximately 195° C. to 160° C.

A further object of this invention is to provide a method to lower the autoignition temperature of the igniter composition of the present application.

This invention further provides a method for lowering the autoignition temperature of a propellant consisting essentially of A) a mixture containing the following components: a) about 60 to about 80% by weight $KClO_3$; b) about 15 to about 30% by weight lactose; and c) about 1 to about 10% by weight of an aliphatic polycarbonate; said method involving adding to said propellant, B) superfine iron oxide in an ignition temperature lowering effective amount up to 10% by weight based upon the combined weight of A) and B).

BRIEF DESCRIPTION OF DRAWINGS

FIG. 1 is a conventional driver-side inflator that may be used in practicing the method of the present invention.

DETAILED DESCRIPTION OF THE INVENTION

FIG. 1 is a drawing of a pyrotechnic generator in which the instant invention may be employed. Since no part of the inflator is reserved for storage capacity, the device is smaller than its counterpart hybrid inflator. In this FIGURE, there is an initiator (11) that will combust in response to a signal from a sensor (not shown), that generates said signal as a result of a change in conditions, e.g., a sudden deceleration of a vehicle (indicative of a crash), in which the inflator is installed. The initiator (11) gives off hot gases that ignite the main generant charge (16), which combusts, generating an inflation gas mixture. Said mixture exits the manifold (14) through the exit ports (15). To insure that the gas generative propellant (16) will be ignited well below its autoignition temperature ($T_{ig}$) and well below that temperature where the materials of construction of the hardware begin to weaken, an autoignition propellant (AIP) (13) having a suitably low $T_{ig}$ is used to ignite the ignition charge (12), which then ignites the propellant (16).

BEST MODE FOR CARRYING OUT THE INVENTION

The present invention is directed to an igniter for gas-generative compositions. The igniter or autoignition propellant of the present invention provides particular advantages over known igniters, including an autoignition temperature which is well below temperatures at which the mechanical strength of containers housing the igniter and associated gas-generative compositions appreciably deteriorate, and likewise is below the autoignition temperatures of most gas-generative charges. Also, autoignition temperatures are relatively unaffected by 17-day storage at 107° C. In the igniter, part B) superfine iron oxide, is added to part A), a propellant mixture, in an ignition temperature lowering effective amount up to about 10% by weight based upon the combined weight of A) and B).

Additional objects and advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

The inventive igniter comprises A) a propellant which is a mixture of potassium chlorate, lactose and an aliphatic polycarbonate. The autoignition lowering portion B) of the igniter consists essentially of superfine iron oxide, known as NANOCAT® commercially. This is produced by Mach I, King of Prussia, Pa. (see Table I).

TABLE I

| NANOCAT ® PROPERTIES | | |
|---|---|---|
| VARIABLE | NANOCAT | STANDARD[1] |
| Particle Size, nm | 3 | large rods |
| Specific surface area, m²/gm | 250 | 10–100 |
| Bulk density, gm/ml | .05 | .56 |
| Ratio iron/oxygen, mole/mole | 2/3 | 2/3 |

(1) Such as MAPICO 516m

The instant igniter can be utilized to ignite all known gas-generative compositions. In this regard, said igniter can easily be incorporated into known inflator devices by merely substituting the new igniter for known igniter compositions or igniter systems. It is to be understood that this igniter can be used in conjunction with inflator devices which exclusively utilize combustible gas-generative compositions, as well as those which utilize stored, compressed gases.

The aliphatic polycarbonate binder aids in compressing the ignition material. However, said igniter can be used either in a pelletized form up to 0.3 gram or in a granular form.

More particularly, the autoignition propellant of the present invention is used together with a gas-generative composition for inflating an inflatable device, such as an automotive air bag or an airplane escape chute, and will provide a lower ignition temperature, and will not loose effectiveness after a 17 day storage at 107° C. Said autoignition propellant consists essentially of A) a mixture containing the following components: a) about 60 to about 80% by weight $KClO_3$; b) about 15 to about 30% by weight lactose; and c) about 1 to about 10% by weight of an aliphatic polycarbonate; and B) superfine iron oxide in an ignition temperature lowering effective amount up to about 10% by weight based upon the combined weight of A) and B). Preferably, the superfine iron oxide is present in an ignition lowering effective amount of about 1% by weight based upon the combined weight of A) and B). The presence of the superfine iron oxide reduces the autoignition temperature of the propellant from approximately 195° C. without said superfine iron oxide to about 160° C. with said superfine iron oxide.

The first part of the autoignition propellant, i.e., A), preferably contains about 70% by weight $KClO_3$; about 25% by weight lactose; and about 5% by weight of an aliphatic polycarbonate, such as that commonly known in the art as "QPAC®". The second part of said igniter i.e., B), contains superfine iron oxide in an amount up to 10% by weight based upon the combined weight of the two parts, preferably in an amount of about 1% by weight based upon the combined weight of A) and B). Not only is the autoignition temperature of the propellant-igniter reduced from 195° C. to 160° C., but the autoignition temperature does not vary significantly from 160° C. over a 17 day period during which the 2-part igniter is maintained at 107° C.

It is critical to the thermal stability of the igniter that superfine iron oxide (SFIO) be employed as the autoignition temperature lowering part of the autoignition propellant. Although the use of standard iron oxide ($Fe_2O_3$) grades having surface areas in the range of 10–20 m²/gm provide an initial reduction in autoignition temperature, approaching that produced by the superfine iron oxide, the standard iron oxide does not maintain the lowered autoignition temperature over a 17 day period at 107° C. This is demonstrated by the data in Table II depicted below.

TABLE II

| Variable | A) | A) + B) | A) + $Fe_2O_3$ | A) + $Fe_2O_3$ |
|---|---|---|---|---|
| Content (%) | 100 | 99 + 1 | 99 + 1 | 95 + 5 |
| Autoignition initial, °C. | 195 | 160 | 165 | 162 |
| 5 days/107° C. | | 163 | 176 | 175 |
| 10 days/107° C. | | 166 | 178 | 182 |
| 17 days/107° C. | | 164 | 180 | 180 |

A) is a mixture of a) 70%/wt $KClO_3$, b) 25%/wt lactose and c) 5%/wt QPAC ® (Table III)

TABLE III

| QPAC ®-40 PROPERTIES | |
| --- | --- |
| Number avg. molecular wt., gm | 50,000 |
| Density, g/cc | 1.26 |
| Elongation, % | 9–160 |
| Tensile Modulus, $10^3$ psi | 300 |
| $H_2O$ absorption, 23° C., % | 0.4 |
| Decomposition Temperature, °C. | 250 |
| Tg, °C. | 40 |
| Heat of Combustion, BTU/lb | 8000 |

[1] QPAC ®-40 = Poly (propylene) carbonate as produced by PAC Polymers Inc. (QPAC is registered trademark)

From the foregoing it is apparent that the present invention functions as a mitigating device for the igniter during a bonfire or slow cook-off event. That is, by the reduction in the ignition temperature of the propellant composition, below its autoignition temperature, catastrophic mishaps are avoided.

Only the preferred embodiment of the invention and a few examples of its versatility are shown and described in the present disclosure. It is to be understood that the invention is capable of use and various other combinations and environments and is capable of changes or modifications within the scope of the inventive concept as expressed herein.

I claim:

1. An autoignition propellant (AIP) for use with a gas generative composition for inflating an inflatable device, the AIP exhibiting a lower autoignition temperature while retaining its effectiveness after a 17-day storage at 107° C., said autoignition propellant consisting essentially of
   A) a mixture containing the following components:
      a) about 60 to about 80% by weight $KClO_3$;
      b) about 15 to about 30% by weight lactose; and
      c) about 1 to about 10% by weight of an aliphatic polycarbonate; and
   B) superfine iron oxide in an autoignition temperature lowering effective amount up to about 10% by weight based upon the combined weight of A) and B).

2. The autoignition propellant according to claim 1 wherein B) the superfine iron oxide is present in an autoignition lowering effective amount of about 1% by weight based upon the combined weight of A) and B).

3. The autoignition propellant according to claim 1 wherein the autoignition temperature is reduced from approximately 195° C. without said B) superfine iron oxide to about 160° C. with said B) superfine iron oxide.

4. The autoignition propellant according to claim 1 wherein the components of
   A) are present in the following amounts:
      a) about 70% by weight $KClO_3$;
      b) about 25% by weight lactose; and
      c) about 5% by weight of an aliphatic polycarbonate; with
   B) superfine iron oxide in an autoignition temperature lowering effective amount up to about 10% by weight based upon the combined weight of A) and B).

5. The autoignition propellant according to claim 4, wherein B) the superfine iron oxide is present in an autoignition temperature lowering effective amount of about 1% by weight based upon the combined weight of A) and B).

6. The autoignition propellant according to claim 1 in which the AIP is in the form of a pressed charge having a weight up to about 0.3 g.

7. In an inflator for an inflatable device, which inflator includes an ignition composition, the improvement wherein as said ignition composition, there is provided
   A) a mixture containing the following components:
      a) about 60 to about 80% by weight $KClO_3$;
      b) about 15 to about 30% by weight lactose; and
      c) about 1 to about 10% by weight of an aliphatic polycarbonate; in combination with
   B) superfine iron oxide in an autoignition temperature lowering effective amount up to about 10% by weight based upon the combined weight of A) and B).

8. The inflator according to claim 7, wherein the inflator includes a supply of pressurized gas.

9. The inflator according to claim 7, wherein inflation gases are provided solely by a gas-generative composition.

10. The inflator according to claim 7, wherein said inflation device comprises an automotive air bag.

11. The inflator according to claim 7, wherein said ignition composition is in the form of a pressed charge having a weight up to 0.3 g.

* * * * *